United States Patent [19]

Rao

[11] 4,002,492

[45] Jan. 11, 1977

[54] RECHARGEABLE LITHIUM-ALUMINUM ANODE

[75] Inventor: Bhaskara M. L. Rao, Fanwood, N.J.

[73] Assignee: Exxon Research & Engineering Co., Linden, N.J.

[22] Filed: July 1, 1975

[21] Appl. No.: 592,219

[52] U.S. Cl. .................................. 429/194; 429/218

[51] Int. Cl.[2] .......................................... H01M 35/02

[58] Field of Search ................ 136/6 LN, 20, 83 R, 136/100 R, 6 LF, 6 F, 137, 154, 155, 83 T

[56] References Cited

UNITED STATES PATENTS

| | | | |
|---|---|---|---|
| 3,751,298 | 8/1973 | Senderoff | 136/6 F |
| 3,796,604 | 3/1974 | Gabano et al. | 136/6 LN |
| 3,898,096 | 8/1975 | Heredy et al. | 136/6 F |
| 3,907,590 | 9/1975 | Saunders | 136/6 LF |
| 3,907,597 | 9/1975 | Mellors | 136/100 R |

*Primary Examiner*—Anthony Skapars
*Attorney, Agent, or Firm*—M. A. Ciomek; Joseph J. Dvorak

[57] ABSTRACT

A high energy density electrochemical cell comprises an anode consisting essentially between about 63% and 92% lithium, on an atomic basis, and the balance essentially aluminum, a cathode and a nonaqueous electrolyte. Advantageously, the cathode is an electrochemically active transition metal chalcogenide, such as titanium disulfide, and the nonaqueous electrolyte is an organic solvent, such as dioxolane, having at least one lithium salt, preferably lithium perchlorate, dissolved therein.

7 Claims, 4 Drawing Figures

Li-Aℓ PHASE DIAGRAM AND COMPOSITIONAL DEPENDENCE OF ELECTRODE POTENTIAL (E°)
Li-Aℓ ELECTRODE POTENTIAL (VOLTS) VS Li REF
TEMPERATURE (°C)
Li-Aℓ COMPOSITION (ATOMIC PERCENT LITHIUM)
I (PHASE DIAGRAM)
II (ELECTRODE POTENTIAL)
E° (Li Aℓ+Li)
E° (LiAℓ+Li2Aℓ)
E° (Li(Aℓ)+LiAℓ)
Li(Aℓ)+LiAℓ
LiAℓ+Li2Aℓ
Li2Aℓ+Li
ΔE=I
ΔE=II
LiAℓ
Li2Aℓ

DEPENDENCE OF ANODE ENERGY DENSITY AS A FUNCTION OF COMPOSITION

VARIATION OF OVER POTENTIAL WITH COMPOSITION OF Li-Al ELECTRODE

Li—Al HALF-CELL BEHAVIOR DURING CYCLING
2.5 Ma/Cm² CHARGE, 10 Ma/Cm² DISCHARGE
2.5M $LiClO_4$ DIOXOLANE

RECHARGEABLE LITHIUM-ALUMINUM ANODE

BACKGROUND OF THE INVENTION

The present invention relates to electrochemical cells and more particularly to electrochemical cells incorporating an improved lithium-containing anode.

Lithium and lithium alloys have been suggested as negative electrodes in electrochemical cells because lithium is highly electronegative and lithium and its alloys have low atomic weights. The combination of high electronegativity plus low atomic weight makes possible the construction of high energy density cells. Although lithium and lithium alloys have many desirable characteristics as use for anode materials, there exist problems that have limited their use as battery anode material.

Lithium is highly reactive and readily reacts with a number of potential organic solvents. Such reactions in a battery environment result in undesirable self-discharging and consequently solvents that react with lithium cannot be used to dissolve appropriate lithium salts to form the electrolyte. It has been suggested that this problem could be overcome by alloying the lithium with a less reactive metal such as aluminum. Where lithium has been alloyed with aluminum to overcome the foregoing problems, alloys containing less than 20 weight percent lithium and preferably in the range of 5 to 20% by weight lithium (or on an atomic basis 30 to 50% lithium) have been employed. The presence of such large amounts of aluminum lowers the reactivity of the lithium but it has the disadvantage of increasing the weight of the anode (aluminum is more than five times as dense as is lithium) and the anode is rendered about 0.3 volt more positive as compared to a pure lithium reference anode.

Another reason for using lithium as an anode material is that lithium is inherently rechargeable, i.e. it can be electrodeposited from lithium ion-containing organic solutions. However, lithium's practical rechargeability is poor because metallic lithium is electrodeposited in dendritic form which can eventually lead to shorting out of the cell. In order to minimize the effects of dendritic growth, it has been suggested to employ cell separators, such as permeable membranes, which act as physical barriers to dendritic growth. Although cell separators are initially effective, lithium dendrites can eventually penetrate the cell separators and establish transient or permanent electronic shorts. Such dendritic growth must be minimized if lithium or lithium-containing alloy anodes are to be widely used.

BRIEF DESCRIPTION

Generally speaking, the present invention relates to an improved anode for high energy density electrochemical cells which include a cathode having a cathode-active material, an anode having an anode-active material, and a nonaqueous electrolyte having an ionic salt of the anode-active material dissolved therein. The improved anode consists essentially of lithium-aluminum alloys that contain lithium in amounts between about 63 and 92% and the balance essentially aluminum.

DETAILED DESCRIPTION

The energy densities of electrochemical cells are improved by employing anodes made of lithium-aluminum alloys that consist essentially of lithium in amounts between about 63 and 92% and the balance essentially aluminum. The improved anodes are advantageously employed in combination with electrochemically active transition metal chalcogenides and nonaqueous electrolytes to provide electrochemical cells that are rechargeable and have high energy densities.

Lithium-aluminum alloys containing between about 63 and 92% lithium contain significant amounts of dilithium aluminide and anodes made of these alloys display many of the advantages of pure lithium anodes while minimizing the adverse electrochemical effects of large amounts of aluminum. These advantages are as follows:

1. decreased sacrifice of half-cell voltage;
2. increased half-cell energy density; and
3. decreased polarization voltage during charge-discharge. These improvements contribute to increased cell voltage, energy densities, and decreased cell polarization.

Figure 1:
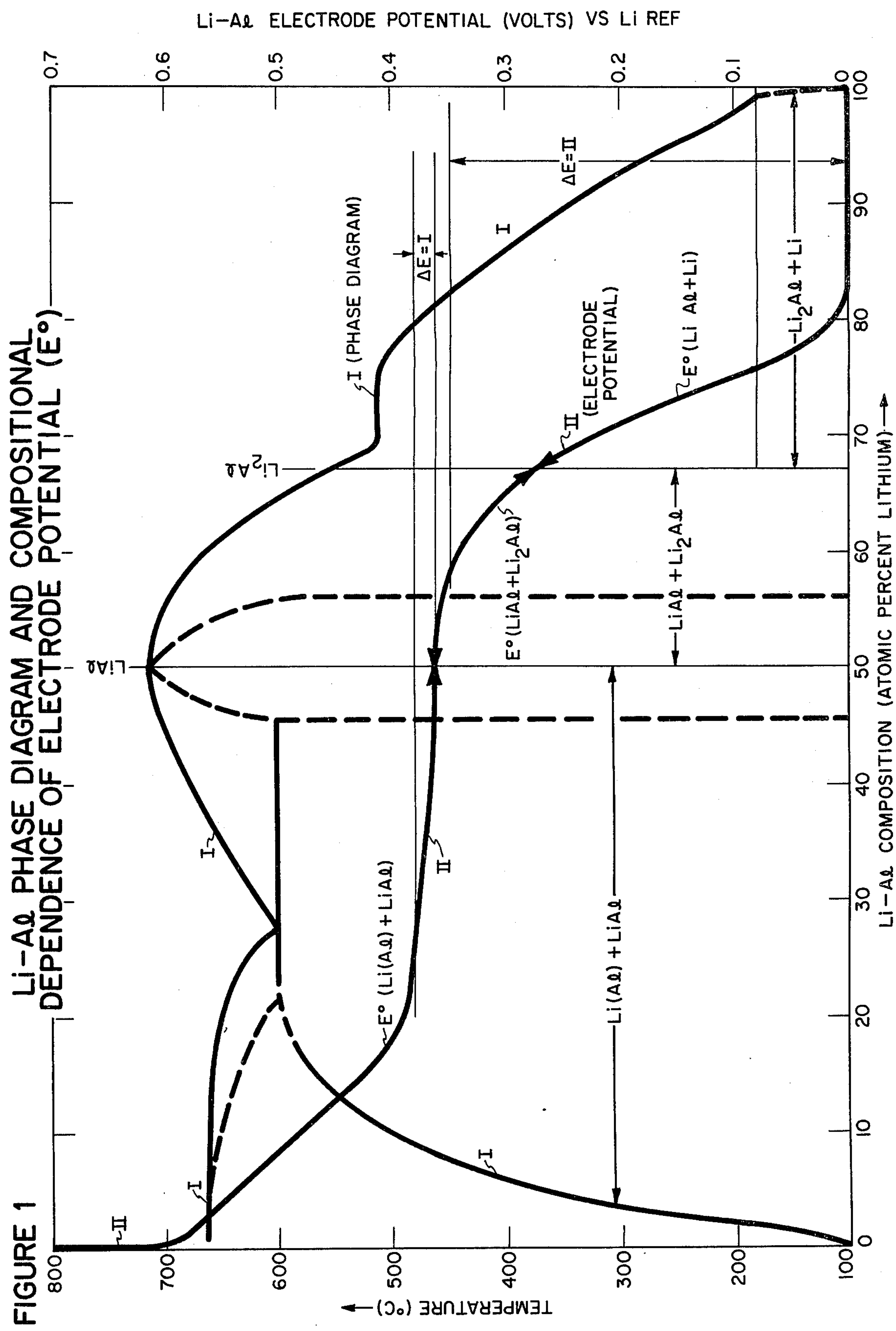
FIG. 1 is a temperature/composition phase equilibrium diagram for lithium and aluminum (as described in "The Constitution of Binary Alloys" by M. Hansen, 2nd Edition, 1958, page 104) upon which is superimposed a graph of electrode potential versus composition. The electrode potential is measured against a pure lithium electrode.

FIG. 1, Curve I, is a phase diagram of the lithium aluminum system. Calculations based on the Inverse Lever Rule show that alloys containing 63% lithium consist essentially of about 64% dilithium aluminide and the balance essentially monolithium aluminide and that alloys containing 92% lithium consist essentially of about 24% dilithium aluminide and the balance essentially metallic lithium. An important feature of the present invention is that the chemical potential of lithium in lithium aluminum alloys increases rapidly for compositions containing 63% lithium or more. As noted before, alloys containing 63% lithium consist essentially of 64% dilithium aluminide and the balance essentially monolithium aluminide, and it is the lithium in the dilithium aluminide which has the increased chemical potential so the preponderant part of dilithium aluminides insures that the lithium in alloys containing the lower amounts of lithium will have a high chemical potential. Alloys containing more than 66.7% lithium contain decreasing amounts of dilithium aluminide with increasing amounts of lithium with dilithium aluminide being replaced by a solid solution of aluminum in lithium. Increasing amounts of the solid solution further improve the chemical potential of the lithium in the alloy but cause the alloy to behave as elemental lithium. As the behavior of the alloy approaches that of elemental lithium those advantages associated with alloying are lost. For example, during charging, dendritic growth on anodes made of alloys containing greater than 92% lithium is for more evident.

The increasing chemical potential of lithium in aluminum-lithium alloys with increasing lithium contents is directly reflected in the half cell potentials of these alloys. As the lithium content of these alloys increases from 63 to 92%, the half cell potential as measured against a lithium reference electrode approaches that of elemental lithium. The improvement of half cell potentials with increasing lithium concentrations is shown in FIG. 1, Curve II. Although not shown in Curve II of FIG. 1, the half cell potential of elemental aluminum as measured against a lithium reference electrode is 1.385 volts. The half cell potentials of alloys containing increasing amounts of lithium as measured against lithium reference electrodes initially drops rapidly to 0.485 volt at a lithium content of 20% and then remains substantially constant over the lithium content interval of 20 to 60%. The difference in half cell potential for alloys containing 20 and 60% lithium is 0.085 volt, $\Delta E_I$ in FIG. 1. The stability of the half cell potentials in this composition interval can be attributed to the presence of non-stoichiometric monolithium aluminide. Alloys containing more than 63% lithium have half cell potentials that rapidly approach that of elemental lithium with alloys containing 82.5% lithium having half cell potentials nearly equal to elemental lithium. There is little, if any, stabilization of the half cell potential at 0.275 volt (the half cell potential of dilithium aluminide) for alloys containing increasing amounts of lithium above 63% as there is a stabilization of half cell potentials about 0.360 volt for alloys containing 20 to 60% lithium. A possible explanation of this diverse behavior is that monolithium aluminide is non-stoichiometric while dilithium aluminide is stoichiometric. Whatever the explanation, the difference in half cell potentials between 63 and 92% lithium is about 0.32 volt, $\Delta E_{II}$ is FIG. 1.

Figure 2:
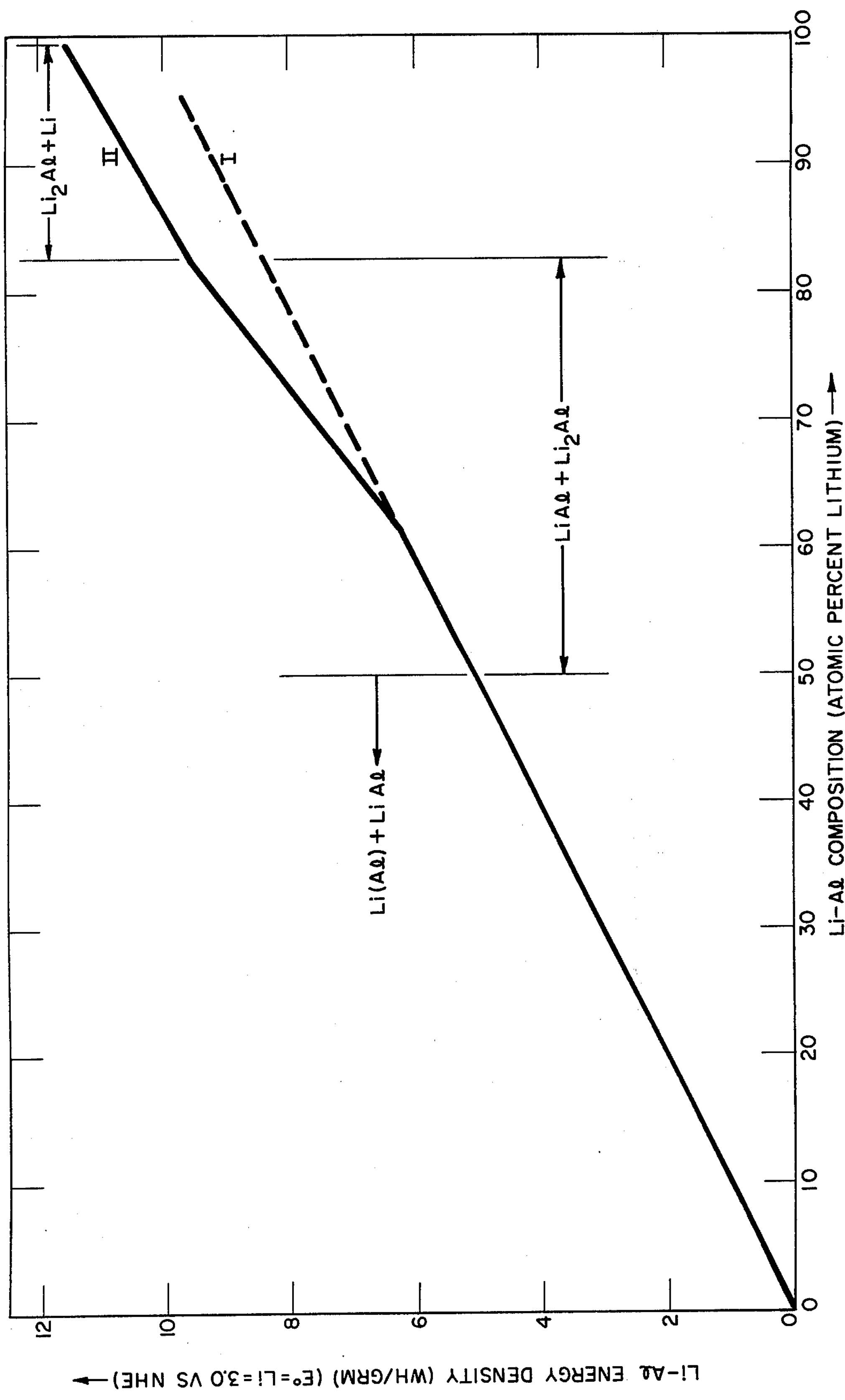
FIG. 2 is a graph showing the relationship between the anode energy density and the lithium content of the anode.

Minimizing the difference between the half cell potential of the aluminum-lithium alloy and a lithium reference electrode by increasing the lithium content of the aluminum-lithium alloy increases the capacity of a cell using the alloy as an anode. As more and more aluminum is replaced by lithium the weight of the cell is significantly reduced. The combination of the increased capacity and the lower weight results in unexpected higher energy densities. This result is illustrated in FIG. 2. The energy densities in watt-hours per gram of anode alloys with increasing lithium contents are shown in FIG. 2. From no lithium to about 61.5% lithium, the energy density of the anode increases linearly to 6.2 watt-hours per gram from zero. At 61.5% lithium, the energy densities of anodes having greater amounts of lithium begin to increase at rates substantially higher than for the compositions having lithium contents less than 61.5%. At 82.5% lithium, the energy density of such anode is more than 1 watt-hour per gram greater than what would be expected if the initial rate of increase in energy density were merely extrapolated. On a percentage basis the actual energy density is about 12% greater at 82.5% lithium than would have been predicted on the basis of lower lithium contents. The increase in the rate of increase of the energy densities will increase lithium contents above 61.5%, coinciding with the increasing amounts of dilithium aluminides that are present in such compositions.

Figure 3:
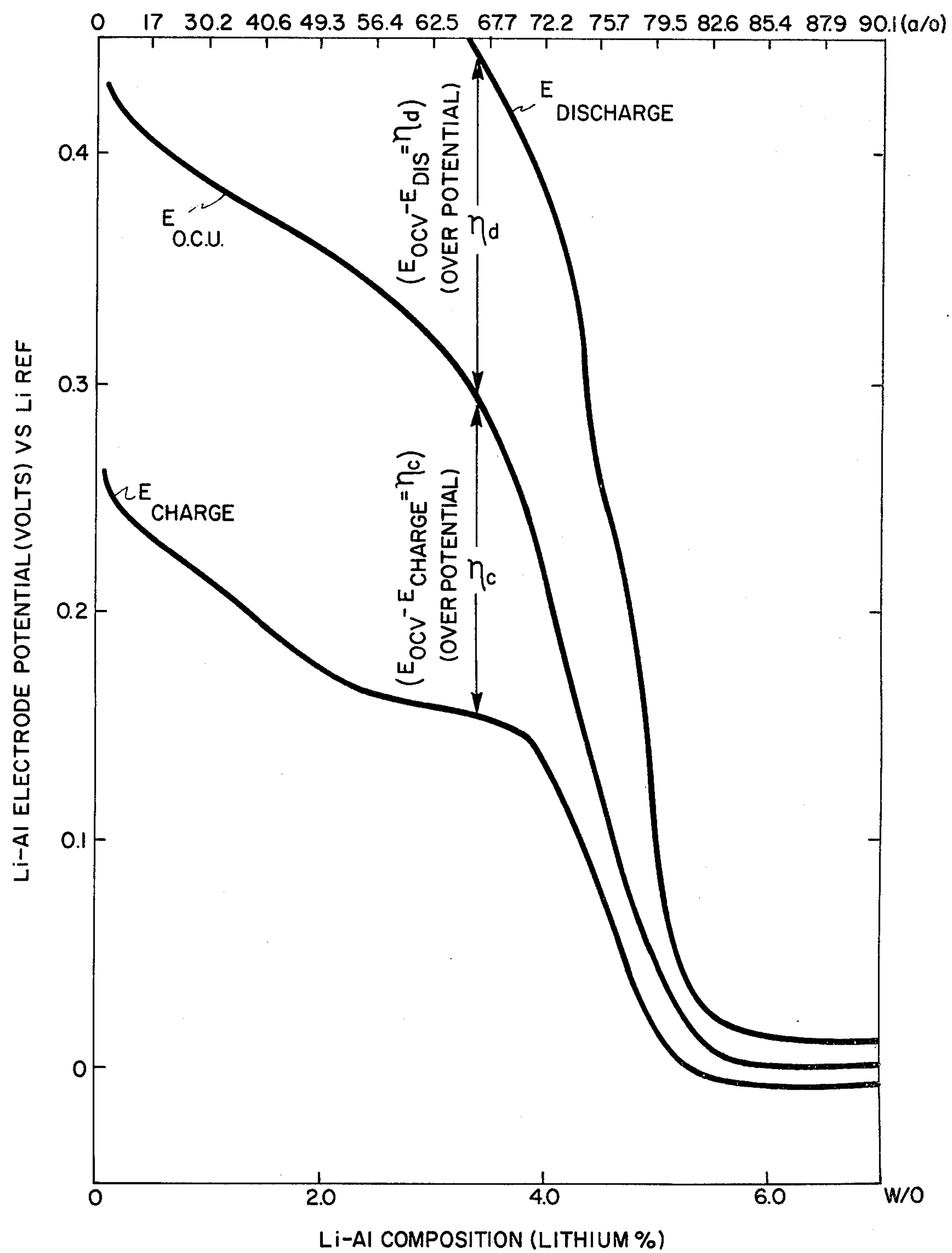
FIG. 3 is a graph depicting the variation of the overpotentials for charging and discharging lithium-aluminum electrodes along with a curve depicting the open circuit voltage for different lithium-aluminum compositions.

Another advantage that anodes made of aluminum-lithium alloys containing more than 63% lithium have is lower over-potentials both upon charging and discharging. The variation of over-potential with increasing lithium contents is shown in FIG. 3. Data for the results presented in FIG. 3 were obtained for charging and discharging at a rate of 4 milliamps per square centimeter (ma/cm$^2$) for alloys containing increasing amounts of lithium produced by electroforming as a 2 mil aluminum foil in a 2 molar lithium perchlorate in tetrahydrofuran (70%) and dimethoxyethane (30%) electrolyte. It is apparent from FIG. 3 that alloys containing less than 50% lithium have undesirably large over-potentials for both charging, $E_C$, and discharging, $E_D$, as compared to the open circuit voltage $E_{OCV}$. Alloys containing 63% lithium or more have far lower over-potentials. Lower over-potentials increase the efficiency of cells by increasing the available energy for discharging and lowering the amount of energy required for charging.

Lithium-aluminum alloys containing between about 63 and 92% lithium can be employed as anode materials. Anodes made of alloys within these ranges will provide greater cell potentials, higher energy densities, lower over-potentials both on charging and on discharging and minimal dendritic growth. However, alloys containing between about 75 and 90% lithium are preferred because of voltage signal at the former and high energy density at the latter.

Lithium-aluminum anodes can be prepared by molding a paste of a powder of the lithium-aluminum of required composition in a binder on a conductive support and then sintering the molded structure. The lithium-aluminum alloy powder can be prepared by melting the appropriate proportions of lithium and aluminum in an inert atmosphere. The melt can then be streamed down a vertical column and the stream can be shattered by high energy inert gas streams to produce finely divided powders of the required lithium-aluminum compositions.

Anodes made of the lithium aluminum alloy are best used in conjunction with an active cathode material of a transition metal chalcogenide, particularly dichalcogenides. The transition metal can be at least one metal selected from the group consisting of titanium and niobium. Examples of transition metal chalcogenides include titanium disulfide, niobium trisulfide, and titanium trisulfide. Titanium disulfide is particularly preferred as an active cathode material on the basis of electrical, weight and cost considerations.

Transition metal dichalcogenides have a layered structure which can be electrochemically intercalated with Lewis bases, and the intercalation process can be reversed by applying a reverse potential to the cell. The capacity of the transition metal dichalcogenides to be electrochemically intercalated and disintercalated makes these materials especially useful as cathode-active materials in high energy cells. This is particularly true of electrochemical cells that employ lithium anodes because lithium ions are rapidly intercalated into transition metal dichalcogenides, particularly titanium disulfide. Such rapid intercalation and disintercalation foster rapid discharge and charging rates.

The nonaqueous electrolyte is basically an organic solvent having a lithium salt dissolved therein. Examples of organic solvents that can be used as electrolytes with the lithium aluminum anode and the titanium disulfide cathode include dioxolane, tetrahydrofuran, dimethoxyethane, and propylene carbonate, although the invention is not limited thereto. Dioxolane has been found a particularly advantageous solvent because it minimizes dendritic growth during recharging. Any lithium salt that is soluble in the organic solvent can be employed. Advantageously, those salts that display the highest solubility are used. Examples of lithium salts include lithium perchlorate, lithium hexafluorophosphate, lithium tetrafluoroborate, lithium aluminum tetrachloride, and lithium thiocyanate. Lithium perchlorate has been found particularly useful because of its high solubility and its low reactivity towards both the cathode and the anode.

Many high energy batteries that use lithium or other alkali metals must be operated at high temperatures. Batteries incorporating the lithium-aluminum anodes of the present invention in conjunction with transition metal dichalcogenide cathodes can be used at ambient temperature or higher, preferably below about 150° C.

In order to give those skilled in the art a better understanding of the invention, the following illustrative example is given:

EXAMPLE 1

A 1×1×0.03 inch sintered anode of an alloy containing 87.5% lithium, on an atomic basis, and the balance essentially aluminum was prepared. The anode had a porosity of 45–50% and had a theoretical capacity of approximately 300 milliamp hour per square inch. A similar sized cathode of titanium disulfide having a porosity of 35–40% and a theoretical capacity of approximately 125 milliamp hour per square inch was also prepared. A nickel current collector was used in the anode and an aluminum current collector was used in the cathode. A cell separator consisting of a first layer of 0.02 inch fiber glass filter paper and a second layer of 0.001 inch of polyethylene porous foil was also prepared. The cell was assembled by placing the anode and cathode parallel to each other and sandwiching the separator between the electrode in a conventional manner, and the resulting structure was held together between opposing glass plates (1×1.5 inch) and a tension clamp. The clamped assembly was placed in a polyethylene container and an electrolyte of 2.5 M lithium perchlorate in dioxolane was added to the container in an amount sufficient to cover the electrodes.

Figure 4:
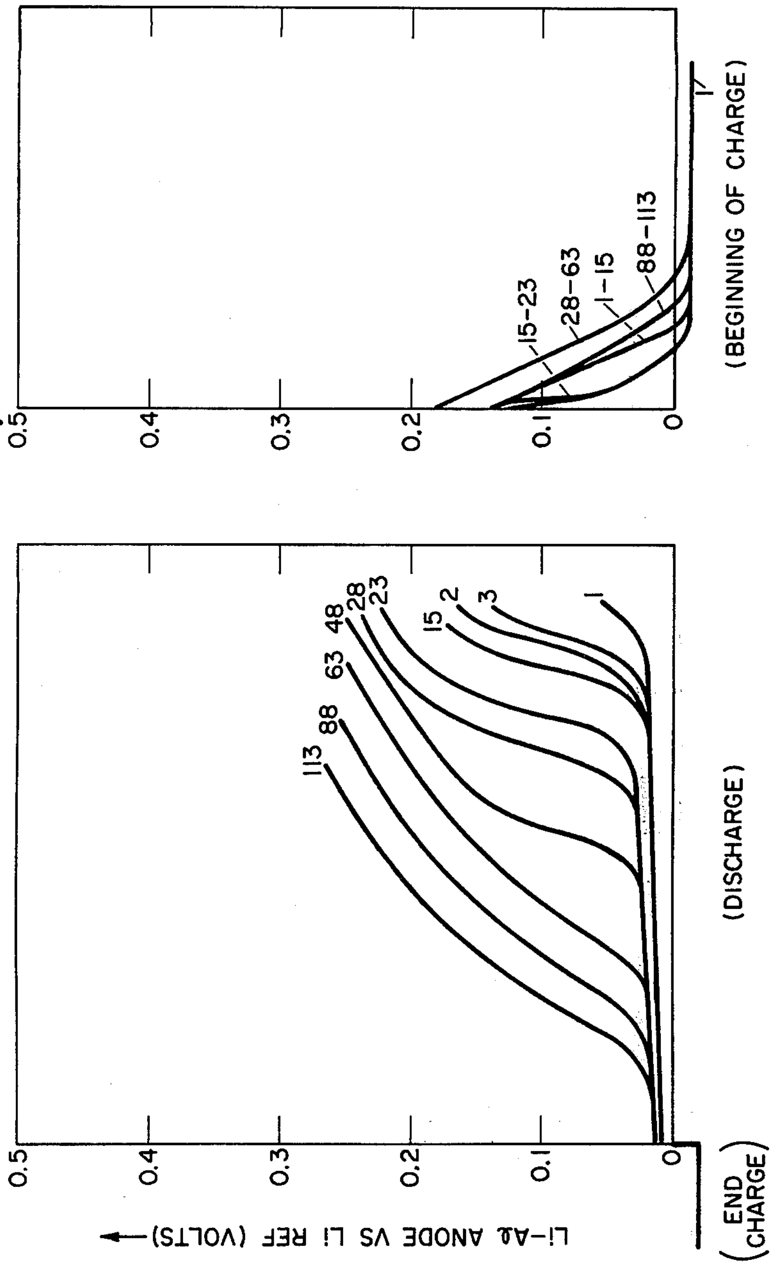
FIG. 4 is a graph showing the charge-discharge cycles of different cycles.

Leads were attached to the electrodes and the cell was cycled by discharging at a rate of 65 milliamps per square inch and charged at a rate of 16.5 milliamps per square inch. The cell was discharged to 1.25 volts and charged to 2.65 volts. One hundred thirteen such cycles were conducted without significant dendritic growth occurring. The charge-discharge curves for different cycles are shown in FIG. 4. The variation in the charge-discharge curves for different cycles was due to charge-discharge limitations of the cell voltage as determined by the cathode limiting operation.

It is to be noted that all solid compositions given herein are on an atomic basis unless otherwise stated. Liquid compositions, except where explicitly noted, are on a volumetric basis.

What is claimed is:

1. An improved high energy density electrochemical cell for operation at temperatures below about 150° C which comprises an anode consisting essentially of between about 63 and 92% lithium and the balance essentially aluminum, a cathode and a nonaqueous electrolyte of an organic solvent having a lithium salt dissolved therein.

2. The cell as described in claim 1 wherein the cathode is made of an electrochemically active transition metal chalcogenide.

3. The cell as described in claim 1 wherein the cathode is made of electrochemically active titanium disulfide.

4. The cell as described in claim 1 wherein the electrolyte is dioxolane.

5. The cell as described in claim 1 wherein the electrolyte is lithium perchlorate dissolved in an organic solvent that is substantially inert to both the anode and the cathode.

6. The cell as described in claim 3 wherein the electrolyte comprises lithium perchlorate dissolved in dioxolane.

7. The cell as described in claim 1 wherein the anode contains between about 75 and 90% lithium.

* * * * *